US008352139B2

(12) United States Patent
Hatori et al.

(10) Patent No.: US 8,352,139 B2
(45) Date of Patent: Jan. 8, 2013

(54) VEHICULAR POWER TRANSMISSION CONTROL APPARATUS

(75) Inventors: Hiroki Hatori, Nishio (JP); Takeshige Miyazaki, Chiryu (JP); Kan Sasaki, Nagoya (JP); Toshio Tanba, Kariya (JP); Yousuke Hayashi, Toyota (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 358 days.

(21) Appl. No.: 12/754,946

(22) Filed: Apr. 6, 2010

(65) Prior Publication Data

US 2010/0262324 A1    Oct. 14, 2010

(30) Foreign Application Priority Data

Apr. 8, 2009    (JP) ................................. 2009-093772

(51) Int. Cl.
*G06F 19/00*    (2006.01)
(52) U.S. Cl. .................... 701/66; 701/22; 401/3; 401/5; 180/65.285; 903/945
(58) Field of Classification Search .................... 701/22, 701/54, 55, 66; 477/3, 5; 903/945; 180/65.275, 180/65.285, 65.31
See application file for complete search history.

(56) References Cited

U.S. PATENT DOCUMENTS

| | | | | |
|---|---|---|---|---|
| 5,844,342 | A * | 12/1998 | Miyatani et al. | 310/114 |
| 6,971,969 | B2 * | 12/2005 | Kitagawa et al. | 477/3 |
| 7,353,100 | B2 * | 4/2008 | Chen et al. | 701/51 |
| 7,770,678 | B2 * | 8/2010 | Nozaki et al. | 180/65.6 |
| 8,171,824 | B2 * | 5/2012 | Miyazaki et al. | 74/661 |
| 2009/0203481 | A1 * | 8/2009 | Nohara et al. | 475/150 |
| 2010/0234171 | A1 * | 9/2010 | Tanba et al. | 477/5 |
| 2010/0262323 | A1 * | 10/2010 | Tanba et al. | 701/22 |

FOREIGN PATENT DOCUMENTS

JP    2000-224710 A1    8/2000

OTHER PUBLICATIONS

U.S. Appl. No. 12/720,940, filed Mar. 10, 2010, Tanba et al.
U.S. Appl. No. 12/720,956, filed Mar. 10, 2010, Miyazaki et al.
U.S. Appl. No. 12/720,964, filed Mar. 10, 2010, Miyazaki et al.
U.S. Appl. No. 12/720,979, filed Mar. 10, 2010, Miyazaki et al.
U.S. Appl. No. 12/720,984, filed Mar. 10, 2010, Miyazaki et al.
U.S. Appl. No. 12/754,931, filed Apr. 6, 2010, Tanba et al.

* cited by examiner

*Primary Examiner* — Ruth Ilan
*Assistant Examiner* — James English
(74) *Attorney, Agent, or Firm* — Burr & Brown

(57) ABSTRACT

An apparatus comprises a changeover mechanism which is able to change a connection state of an electric motor output shaft to any one of "an IN-Connection State" in which a power transmission path is provided between a transmission input shaft and the electric motor output shaft, "an OUT-Connection State" in which a power transmission path is provided between the transmission output shaft and the electric motor output shaft, and "a neutral state" in which no transmission path therebetween is provided. When a kick-down-condition is satisfied, a changeover operation for changing an electric motor connection state to the OUT-Connection State is firstly performed. Thereafter, a gear position shifting operation for increasing a transmission reduction ratio is performed. After the kick-down-condition satisfied, an E/G side output torque Te and a M/G side output torque Tm is adjusted in such a manner that a sum Ts of Te and Tm continues to increase.

7 Claims, 3 Drawing Sheets

IN-Connection

OUT-Connection non-Connection

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

In the meanwhile, in the hybrid vehicle, there is a case where a connection state (hereinafter, referred to as an "IN-Connection State") is used in which a power transmission path between an output shaft of the electric motor and an input shaft of a transmission is provided/realized, and there is another case where another connection state (hereinafter, referred to as an "OUT-Connection State") is used in which a power transmission path between the output shaft of the electric motor and an output shaft of the transmission (and thus, driving wheels) is provided/realized without involving the transmission.

In the "IN-Connection State", a rotational speed of the output shaft of the electric motor with respect to a vehicle speed can be varied by changing a gear position of the transmission. Accordingly, adjusting the gear position of the transmission can provide an advantage such that the rotational speed of the output shaft of the electric motor can easily be maintained within a range in which an energy conversion efficiency (more specifically, an efficiency in generating the driving torque, the regeneration torque, or the like) is high.

On the other hand, the "OUT-Connection State" provides an advantage such that a power transfer loss can be made smaller, since the power transmission path does not involve the transmission having a complicated mechanism. In addition, in the transmission (especially, in a transmission of a type which does not include a torque converter), a power transmission from the input shaft of the transmission to the output shaft of the transmission is generally shut off temporarily during a gear position shifting operation (during an operation by which the gear position is changed). Consequently, a rapid change (so-called shift shock) in an acceleration in a front-rear direction of the vehicle tends to occur. However, the "OUT-Connection State" allows the driving torque from the electric motor to be continuously transmitted to the output shaft of the transmission (and therefore to the drive wheels) even during the gear position shifting operation, and therefore provides an advantage such that the shift shock is suppressed.

In view of the above, the applicant of the present invention has already proposed a changeover mechanism which can change/switch a connection state of the output shaft of the electric motor between the IN-Connection State and the OUT-Connection State, in Japanese Patent Application No. 2007-271556. Hereinafter, the connection state of the output shaft of the electric motor may simply be referred to as "an electric-motor-connection-state". The changeover mechanism can further change the electric-motor-connection-state to a state in which neither a power transmission path between the output shaft of the electric motor and the input shaft of the transmission nor a power transmission path between the output shaft of the electric motor and the output shaft of the transmission is provided. Hereinafter, this state is referred to as a "non-connection state".

In the meantime, in a case in which a driver of the vehicle increases an operation amount of an acceleration operating member (e.g., an acceleration pedal), an operation (hereinafter, referred to as "a kick-down-operation") to increase a reduction ratio of the transmission (i.e., an operation to change the gear position of the transmission to a lower gear position) may be performed, when a predetermined condition is satisfied (e.g., when a sufficient driving force can not be generated with respect to the increased operation amount).

When the kick-down-operation is performed, a larger driving force is required. However, no suggestion has been made as to how the electric-motor-connection-state is changed when the kick-down-operation is performed.

An object of the present invention is therefore to provide a vehicular power transmission control apparatus applied to a vehicle comprising an internal combustion engine and an electric motor as power sources, the control apparatus being able to appropriately change the electric-motor-connection-state when the kick-down-operation is performed.

The vehicular power transmission control apparatus according to the present invention comprises a transmission, a changeover mechanism, determining means, and control means. Hereinafter, each of them will be described in order.

The transmission comprises: an input shaft to provide/realize a power transmission path between the input shaft of the transmission and an output shaft of the internal combustion engine; and an output shaft to provide/realize a power transmission path between the output shaft of the transmission and drive wheels of the vehicle. The transmission is configured so as to be able to adjust a ratio (the reduction ratio of the transmission) of a rotational speed of the input shaft of the transmission to a rotational speed of the output shaft of the transmission. The transmission may be a multiple gear ratio transmission which can realize/provide any one of a plurality of predetermined reduction ratios different from each other as the reduction ratio of the transmission, or may be a continuously variable transmission which can adjust the reduction ratio continuously (or in non-stepwise fashion) as the reduction ratio of the transmission.

Further, the transmission may be "a multiple gear ratio transmission or a continuously variable transmission (so-called automatic transmission (AT))" comprising a torque converter and being configured in such a manner that the gear position shifting operation is automatically performed in accordance with a driving/running condition of the vehicle, or may be "a multiple gear ratio transmission without the torque converter (so-called manual transmission (MT))". If the transmission is the manual transmission, the transmission may be, but not limited to, any one of the following types.

A type in which the gear position shifting operation is performed directly by a force applied to a shift lever from the driver.

A type in which the gear position shifting operation is performed by a drive force generated by an actuator which is driven in response to a signal indicative of a position of the shift lever which the driver operates.

A type in which the gear position shifting operation can be automatically performed by a drive force generated by an actuator which is automatically driven in accordance with a driving condition of the vehicle, without depending on an operation of the shift lever by the driver (i.e., a so-called automated manual transmission).

The changeover mechanism is configured so as to change the electric-motor-connection-state to any one of two or more of an input-side-connection state, an output-side-connection state, and a non-connection state, the input-side-connection state (IN-Connection State) being a state in which a power transmission path is provided between the output shaft of the electric motor and the input shaft of the transmission, the output-side-connection state (OUT-Connection State) being a state in which a power transmission path is provided between the output shaft of the electric motor and the output shaft of the transmission without involving the transmission, and the non-connection state being a state in which neither a power transmission path between the output shaft of the electric motor and the input shaft of the transmission, nor a power transmission path between the output shaft of the electric motor and the output shaft of the transmission is provided.

That is, the changeover mechanism may be, but not limited to, one of the followings.

A changeover mechanism which can change the electric-motor-connection-state into any one of the IN-Connection State and the non-connection state, only.

A changeover mechanism which can change the electric-motor-connection-state into any one of the OUT-Connection State and the non-connection state, only.

A changeover mechanism which can change the electric-motor-connection-state into any one of the IN-Connection State and the OUT-Connection State, only.

A changeover mechanism which can change the electric-motor-connection-state into any one of the IN-Connection State, the OUT-Connection State, and the non-connection state.

In the IN-Connection State, "a first reduction ratio" (which is a ratio of the rotational speed of the output shaft of the electric motor to the rotational speed of the input shaft of the transmission) is generally fixed to a constant (e.g., 1). A ratio (hereinafter, referred to as "a second reduction ratio") of a rotational speed of the output shaft of the internal combustion engine to a rotational speed of the input, shaft of the transmission is also generally set to a constant (e.g., 1).

The determining means determines/judges whether or not a kick-down-condition, which is a condition for increasing the reduction ratio of the transmission, is satisfied based on an increase in an operation amount of an acceleration operating member operated by the driver of the vehicle. Specifically, for example, the kick-down-condition is satisfied when a maximum value of a driving torque which can be generated at the output shaft of the transmission (accordingly, at the drive wheels) (i.e., a maximum value of a sum of an electric-motor-side-output-torque and an internal-combustion-engine-side-output-torque) in a current/present reduction ratio of the transmission (i.e., a current/present gear position of the transmission) is smaller than or equal to a value equal to a predetermined percentage of a driving torque (hereinafter, referred to as "a required torque") which the driver requires and which is obtained based on the operation amount of the acceleration operating member (after increased).

When and after the kick-down-condition is satisfied (upon a satisfaction of the kick-down-condition), the control means firstly controls the changeover mechanism so as to perform an changeover operation for changing the connection state of the output shaft of the electric motor, and controls the transmission so as to perform a gear position shifting operation for increasing the reduction ratio of the transmission after the changeover operation is completed.

Hereinafter, a product of the first reduction ratio and the reduction ratio of the transmission in the IN-Connection State is defined as an "IN-connection reduction ratio", the first reduction ratio being the ratio of the rotational speed of the output shaft of the electric motor to the rotational speed of the input shaft of the transmission in the IN-Connection State. A ratio of the rotational speed of the output shaft of the electric motor to a rotational speed of the output shaft of the transmission in the OUT-Connection State is defined as an "OUT-connection reduction ratio". "The IN-connection reduction ratio" can vary with a change in the reduction ratio of the transmission (hereinafter, referred to as "a transmission reduction ratio"). On the other hand, "the OUT-connection reduction ratio" is kept constant irrespective of the transmission reduction ratio.

Further, a torque transmitted to the output shaft of the transmission, and the torque being based on (owing to) a torque (electric-motor-torque) of the output shaft of the electric motor, is defined as "the electric-motor-side-output-torque". A torque transmitted to the output shaft of the transmission, and the torque being based on (owing to) a torque (internal-combustion-engine-torque) of the output shaft of the internal combustion engine, is defined as "the internal-combustion-engine-side-output-torque".

Generally, the internal-combustion-engine-torque is not substantially transmitted to the output shaft of the transmission during the gear position shifting operation (i.e., the internal-combustion-engine-side-output-torque is substantially zero). Similarly, the electric-motor-torque is not substantially transmitted to the output shaft of the transmission during the changeover operation (i.e., the electric-motor-side-output-torque is substantially zero). According to the configuration described above, the vehicle can be sufficiently accelerated based on (by) the electric-motor-side-output-torque, after a time (timing) at which changeover operation is completed, at latest.

Further, the control means changes (over) the connection state of the output shaft of the electric motor from a connection state other than the OUT-Connection State to the OUT-Connection State. That is, in a case in which the electric-motor-connection-state is in the state other than the OUT-Connection State at the timing (time) at which the kick-down-condition is satisfied, the electric-motor-connection-state is changed (over) from the current/present connection state to the OUT-Connection State (on the other hand, in a case in which the electric-motor-connection-state is in the OUT-Connection State at the timing at which the kick-down-condition is satisfied, the electric-motor-connection-state remains unchanged). As a result, as described above, the electric-motor-torque can be continuously transmitted to the output shaft of the transmission (accordingly, to the drive wheels) even during the gear position shifting operation. Accordingly, the so-called shift shock can be suppressed, and the vehicle can be sufficiently accelerated. It should be noted that whether the changeover operation is allowed or prohibited is determined based on the driving condition of the vehicle, and the changeover operation may be performed only in a case in which the electric-motor-connection-state is in the state other than the OUT-Connection State at the timing at which the kick-down-condition is satisfied and the changeover operation is determined to be allowed.

As described above, according to the vehicular power transmission control apparatus of the present invention, when the kick-down-operation is performed, the vehicle can be sufficiently accelerated by the electric-motor-side-output-torque from the completion of the changeover operation, at latest. In addition, during the gear position shifting operation after the completion of the changeover operation, the vehicle can continue to be sufficiently accelerated by the electric-motor-side-output-torque owing to the OUT-Connection State. It should be noted that examples of the changeover operation described above (a pattern of the changeover) may include a changeover from the non-connection state to the OUT-Connection State, and a changeover from the IN-Connection State to the OUT-Connection State.

In the vehicular power transmission control apparatus according to the present invention, the control means is preferably configured so as to adjust the internal-combustion-engine-side-output-torque in such a manner that the internal-combustion-engine-side-output-torque is increased, after the kick-down-condition is satisfied and before the changeover operation is completed (the internal-combustion-engine-side-output-torque being a torque transmitted to the output shaft of the transmission, and the torque being based on (owing to) the torque of the output shaft of the internal combustion engine).

According to the configuration described above, the vehicle can be sufficiently accelerated by the internal-combustion-engine-side-output-torque from a timing (time) which is before the changeover operation is completed. That is, the vehicle can be sufficiently accelerated from an earlier stage after the satisfaction of the kick-down-condition, compared to a case in which the internal-combustion-engine-side-output-torque is not increased after the satisfaction of the kick-down-condition.

In this case, the control means may be configured so as to decrease an electric-motor-side-output-torque before the changeover operation is started, the electric-motor-side-output-torque being a torque which is transmitted to the output shaft of the transmission and which is owing to the torque of the output shaft of the electric motor. Further, in this case, it is preferable that the control means be configured so as to adjust the electric-motor-side-output-torque and the internal-combustion-engine-side-output-torque in such a manner that a total torque is increased while the electric-motor-side-output-torque is decreased, the total torque being a sum of the internal-combustion-engine-side-output-torque and the electric-motor-side-output-torque.

Generally, in order to perform the changeover operation smoothly, the electric motor torque is adjusted so as to be zero or a value close to zero and the electric-motor-side-output-torque is maintained at zero, during the changeover operation. Accordingly, if the electric-motor-side-output-torque is larger than zero before the changeover operation is started, the electric-motor-side-output-torque is started to be decreased to zero at a time before the changeover operation is started. According to the configuration described above, even in this case, the vehicle can be sufficiently accelerated owing to the internal-combustion-engine-side-output-torque and the electric-motor-side-output-torque from the time before the changeover operation is started. That is, the vehicle can be sufficiently accelerated from an earlier stage, compared to a case in which the total torque decreases before the changeover operation is started.

Further, in this case, it is preferable that the control means be configured so as to, after the changeover operation is completed and before the gear position shifting operation is started, adjust the electric-motor-side-output-torque and the internal-combustion-engine-side-output-torque in such a manner that the internal-combustion-engine-side-output-torque is decreased, and the total torque is increased while the internal-combustion-engine-side-output-torque is decreased.

Generally, in order to perform the gear position shifting operation smoothly, the internal combustion engine torque is adjusted so as to be zero or a value close to zero and the internal-combustion-engine-side-output-torque is maintained at zero during the gear position shifting operation. Accordingly, if the internal-combustion-engine-side-output-torque is larger than zero before the gear position shifting operation is started, the internal-combustion-engine-side-output-torque is started to be decreased to zero at a time before the gear position shifting operation is started. According to the configuration described above, in this case, the vehicle can continue to be sufficiently accelerated owing to the internal-combustion-engine-side-output-torque and the electric-motor-side-output-torque during a period between the completion of the changeover operation and the start of the gear position shifting operation, in addition to a period in which the changeover operation is being performed.

Further, in this case, it is preferable that the control means be configured so as to, during the gear position shifting operation is performed, adjust the electric-motor-side-output-torque in such a manner that the electric-motor-side-output-torque is equal to the drive torque (required torque) which the driver requires and which is a value obtained based on the operation of the acceleration operating member.

As described above, the internal-combustion-engine-side-output-torque is zero during the gear position shifting operation is being performed. Accordingly, the electric-motor-side-output-torque can be made continue to be equal to the required torque while the gear position shifting operation is being performed, according to the configuration described above. This allows the driver to have a feeling that the gear position shifting operation has already finished at a time close to the start of the gear position shifting operation. In other words, the configuration described above can provide to the driver a feeling that the gear position shifting operation finishes earlier than a time at which the gear position shifting operation actually ends.

It is preferable that the vehicular power transmission control apparatus according to the present invention be applied to the vehicle having the automated manual transmission described above as the transmission. In this case, a clutch mechanism is provided between the output shaft of the internal combustion engine and the input shaft of the transmission. The clutch mechanism can shut (break/terminate) or provide (realize) a power transmission path between the output shaft of the internal combustion engine and the input shaft of the transmission. In addition, in this case, the transmission does not comprise the torque converter, but is the multiple gear ratio transmission which can realize any one of a plurality of predetermined reduction ratios different from one another as the transmission reduction ratio. Further, the control means is configured so as to control, based on the driving condition (e.g., the vehicle speed and the required torque) of the vehicle, shutting and providing of the power transmission path by the clutch mechanism, and the gear position of the transmission.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Next will be described embodiments of a vehicular power transmission control apparatus according to the present invention with reference to the drawings.
(Configuration)

Figure 1:
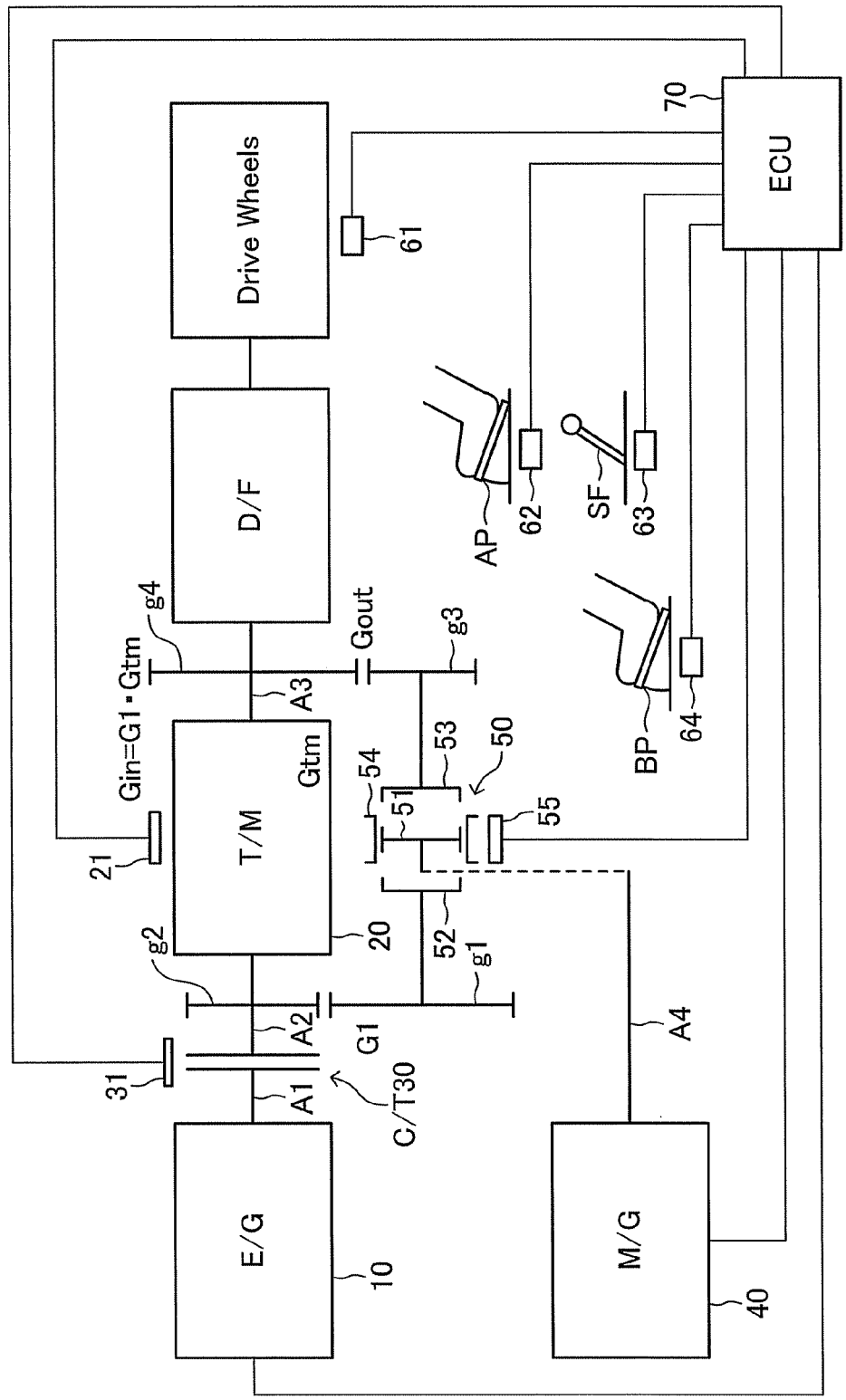
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines. The E/G 10 may be a gasoline engine which uses a gasoline as a fuel, or a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmissions. The T/M 20 has a plurality of gear positions (e.g., five gear positions) as forward gear positions, one gear position as a reverse gear position, and a neutral gear position. The T/M 20 does not comprise a torque convertor. Hereinafter, the gear positions as forward gear positions and the gear position as the reverse gear position are referred to as "gear positions for driving". When any one of the gear positions for driving is realized/achieved, a power transmission path between the input shaft A2 and the output shaft A3 of the T/M 20 is realized/provided. When the neutral gear position is realized/achieved, a power transmission path between the output shafts A2 and A3 of the T/M 20 is not realized/provided. When any one of the gear positions for driving is realized/achieved, the T/M 20 is configured so as to be able to set a transmission reduction ratio Gtm at one of a plurality of reduction ratios. The transmission reduction ratio Gtm is a ratio of a rotational speed of the input shaft A2 to a rotational speed of the output shaft A3. The T/M20 changes/shifts the gear position only by controlling a T/M actuator 21.

The C/T 30 comprises one of well-known structures and is configured in such a manner that the C/T 30 can shut-off (break) and provide (completely-provide (or fully-provide)•incompletely-provide(or half-provide-half-shut)) a power transmission path between the output shaft A1 of the E/G 10 and the input shaft A2 of the T/M 20. In the vehicle, a clutch pedal is not provided. A state-of-connecting of the C/T 30 is controlled only by an actuator 31. When the C/T 30 is in a complete-connection state (i.e., the power transmission path between the output shaft A1 of the E/G 10 and the input shaft A2 of the T/M 20 is completely provided/realized), the output shaft A1 of the E/G 10 and the input shaft A2 of the T/M 20 rotate at the same rotational speed, and accordingly, "the second reduction rate" described above becomes equal to "1".

The M/G 40 comprises one of well-known structures (e.g., an AC synchronous motor), and is configured in such a manner that a rotor (not shown) rotates integrally with an output shaft A4. The M/G 40 functions as the power source as well as the electric power generator.

The changeover mechanism 50 is a mechanism which changes (over) a connection state of the output shaft A4 of the M/G 40. The changeover mechanism 50 comprises a connection piece 51 which rotates integrally with the output shaft A4 of the M/G 40, a connection piece 52 which rotates integrally with a gear g1, a connection piece 53 which rotates integrally with a gear g3, a sleeve 54, and a changeover actuator 55. The gear g1 always meshes with the gear g2 which rotates integrally with the input shaft A2 of the T/M 20. The gear g3 always meshes with a gear g4 which rotates integrally with the output shaft A3 of the T/M 20.

The sleeve 54 is provided so as to be coaxially with the output shaft A4 of the M/G 40 and movable in an axial direction of the output shaft A4 of the M/G 40. A position of the sleeve 54 along the axial direction is controlled by the changeover actuator 55. The sleeve 54 is able to spline-engage with the connection pieces 51, 52, and 53.

Figure 2A:
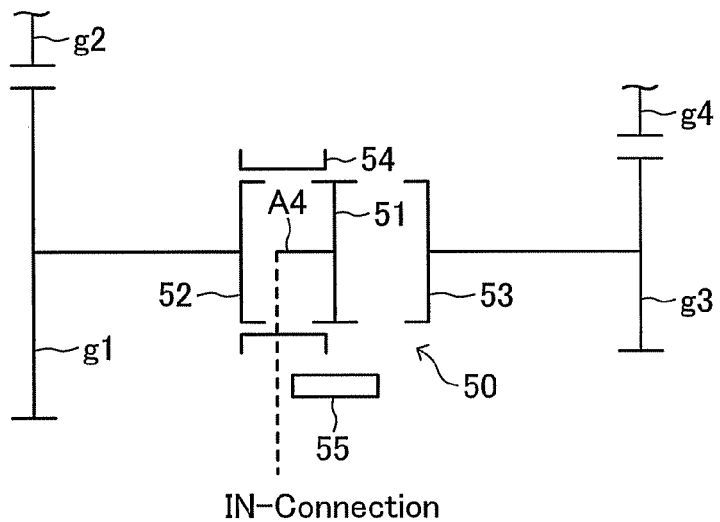
FIG. 2A is a schematic view showing one of three states which the changeover mechanism shown in FIG. 1 can realize.

When the sleeve 54 is controlled to an IN-Connection position shown in FIG. 2A, the sleeve 54 spline-engages with the connection pieces 51 and 52. Accordingly, a power transmission path between the input shaft A2 of the T/M 20 and the output shaft A4 of the M/G 40 is realized/provided through the gear g1 and the gear g2. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product (G1·Gtm) of the first reduction ratio G1 and the transmission reduction ratio Gtm is referred to as an "IN-connection reduction ratio Gin". In the present example, G1=(the number of teeth of the gear g2)/(the number of teeth of the gear g1), and therefore, Gin=Gtm·(the number of teeth of the gear g2)/(the number of teeth of the gear g1). That is, the IN-connection reduction ratio Gin varies in accordance with a change in the gear position of the T/M 20.

Figure 2B:
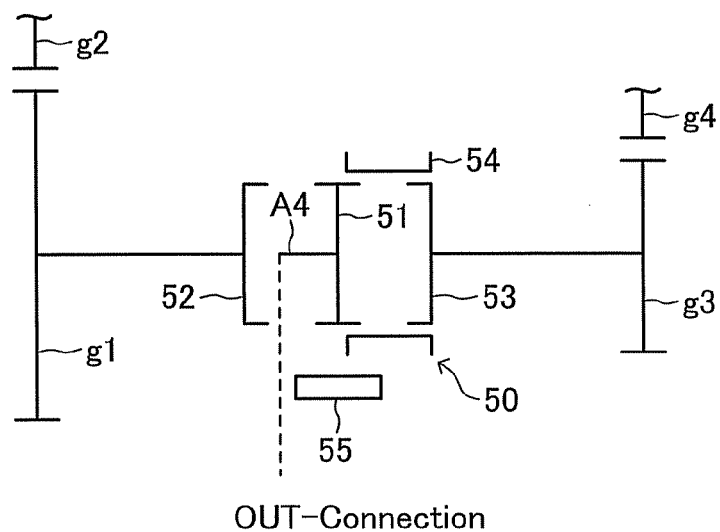
FIG. 2B is a schematic view showing one of three states which the changeover mechanism shown in FIG. 1 can realize.

When the sleeve 54 is controlled to an OUT-Connection position shown in FIG. 2B, the sleeve 54 spline-engages with the connection pieces 51 and 53. Accordingly, a power transmission path between the output shaft A3 of the T/M 20 and the output shaft A4 of the M/G 40 is realized/provided through the gear g3 and the gear g4, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear g4)/(the number of teeth of the gear g3) and thus is constant. That is, the OUT-connection reduction ratio Gout does not vary in accordance with a change in the gear position of the T/M 20.

Figure 2C:
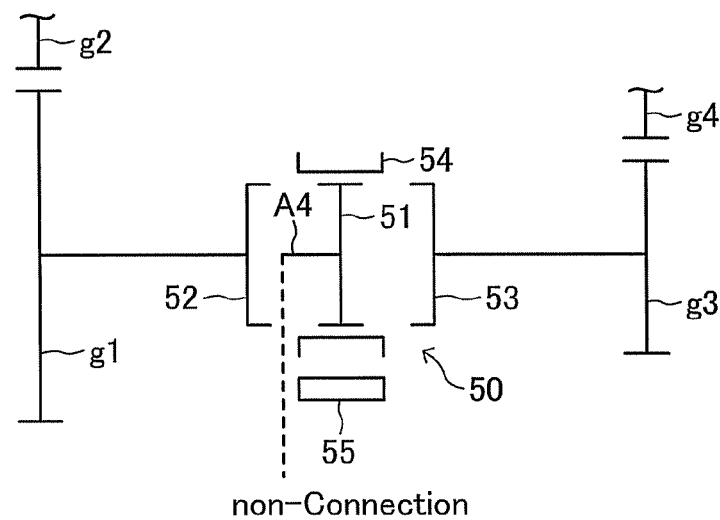
FIG. 2C is a schematic view showing one of three states which the changeover mechanism shown in FIG. 1 can realize.

When the sleeve 54 is controlled to a non-connection position shown in FIG. 2C, the sleeve 54 spline-engages only with the connection piece 51. Accordingly, neither a power transmission path between the output shaft A3 of the T/M 20 and the output shaft A4 of the M/G 40, nor a power transmission path between the input shaft A2 of the T/M 20 and the output shaft A4 of the M/G 40 is realized/provided. This state is referred to as a "neutral state (non-connection state)".

As described above, the changeover mechanism 50 selectively changes the connection state (hereinafter, referred to as "a M/G-connection-state") of the output shaft A4 of the M/G 40 into one of "the IN-Connection State", "the OUT-Connection State", and "the neutral state", by controlling the changeover actuator 55 (to thereby control the position of the sleeve 54).

The output shaft A3 of the T/M 20 is connected with a differential mechanism D/F which is connected with a pair of drive wheels including a left drive wheel and a right drive wheel. It should be noted that a so-called final reduction ratio mechanism may be provided between the output shaft A3 of the T/M 20 and the differential mechanism D/F.

The present apparatus further comprises a wheel speed sensor 61 which detects a wheel speed of the drive wheels, an acceleration pedal opening degree sensor 62 which detects an operation amount of an acceleration pedal AP, a shift position sensor 63 which detects a position of a shift lever SF, and a break sensor 64 which detects whether or not a brake pedal is operated.

The present apparatus further comprises an electronic control unit ECU 70. The ECU 70 controls the actuators 21, 31, and 55, based on information and so on from the sensors 61-64 and another sensors, to thereby control the gear position of the T/M 20, the state-of-connecting of the C/T 30, and the connection state of the changeover mechanism 50. Further, the ECU 70 controls the output (driving torque) of each of the E/G 10 and M/G 40.

The gear position of the T/M 20 is controlled based on a vehicle speed V obtained from the wheel speed sensor 61, a required driving torque Tr, and a position of the shift lever SF obtained from the shift position sensor 63. The required driving torque Tr (a torque of the output shaft A3 of the T/M 20) is calculated based on the operation amount of the acceleration pedal AP obtained from the acceleration pedal opening degree sensor 62. The operation amount of the acceleration pedal AP and the position of the shift lever SF are changed by the driver. When the position of the shift lever SF is at a position corresponding to a "manual mode", the gear position of the T/M 20 is basically set at a gear position selected by the driver who selects the gear position by operating the shift lever SF. On the other hand, when the position of the shift lever SF is at a position corresponding to an "automatic mode", the gear position of the T/M 20 is automatically controlled based on "a combination of the vehicle speed V and the required driving torque Tr", even when the shift lever SF is not operated. Hereinafter, an operation when the gear position of the T/M is changed is referred to as "a gear position shifting operation". A start (commencement) of the gear position shifting operation corresponds to a start (commencement) of a movement of members which move with respect to the change of the gear position. An end of the gear position shifting operation corresponds to an end of a movement of members which move with respect to the change of the gear position.

The state-of-connecting of the C/T 30 is generally kept at the complete-connection state. The state-of-connecting of the C/T 30 is temporarily changed from the complete-connection state to the shut-off state (1) while a shift up operation or a shift down operation of the T/M 20 is being carried out, or (2) when the position of the shift lever SF is at "the neutral position", etc. When the state-of-connecting of the C/T 30 is in the half-provide-half-shut state, the C/T 30 can adjust/vary a maximum torque which the C/T 30 can transmit (hereinafter, this maximum torque is referred to as "a clutch torque"). The clutch torque can be adjusted more precisely than the torque of the output shaft A1 of the E/G 10 itself. Accordingly, controlling/varying the clutch torque while maintaining the torque of the output shaft A1 of the E/G 10 at a value larger than the clutch torque allows "a torque transmitted to the input shaft A2 of the T/M 20, the transmitted torque being based on (owing to) the torque of the output shaft A1 of the E/G 10", to be adjusted more precisely.

The M/G 40 is used as a (driving) power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

Hereinafter, the torque of the output shaft A1 of the E/G 10 is referred to as "an E/G torque", and the torque of the output shaft A4 of the M/G 40 is referred to as "an M/G torque". A rotational speed of the output shaft A1 of the E/G 10 is referred to as "an E/G rotational speed", and a rotational speed of the output shaft A4 of the M/G 40 is referred to as "an M/G rotational speed". A torque transmitted to the output shaft A3 of the T/M 20, the torque being based on (or owing to) the E/G torque, is referred to as "an E/G side output torque Te". A torque transmitted to the output shaft A3 of the T/M 20, the torque being based on (or owing to) the M/G torque, is referred to as "an M/G side output torque Tm". The E/G side output torque Te is equal to a value obtained by multiplying the E/G torque by a product of the transmission reduction ratio Gtm and the second reduction ratio which is equal to 1, when the CIT 30 is in the complete-connection state. That is, the E/G side output torque Te is equal to a product of the E/G torque and the transmission reduction ratio Gtm, when the C/T 30 is in the complete-connection state. In the IN-Connection State, the M/G side output torque Tm is equal to a value obtained by multiplying the M/G torque by the IN-connection reduction ratio Gin. In the OUT-Connection State, the M/G side output torque Tm is equal to a value obtained by multiplying the M/G torque by the OUT-connection reduction ratio Gout. The M/G side output torque Tm can be adjusted by adjusting the M/G torque. The E/G side output torque Te can be adjusted by adjusting the E/G torque or by adjusting the clutch torque.

Generally, in the present apparatus, a distribution between the E/G torque and the M/G torque is adjusted in such a manner that a sum of the E/G side output torque Te and the M/G side output torque Tm coincides with the required driving torque Tr, according to one of well-known methods.

In the changeover mechanism 50, the sleeve 54 is moved so that the M/G-connection-state is changed (over). Hereinafter, the movement of the sleeve 54 is referred to as "a changeover operation". A start (commencement) of the changeover operation corresponds to a start (commencement) of the movement of the sleeve 54. An end (completion) of the changeover operation corresponds to an end (completion) of the movement of the sleeve 54. The changeover of the M/G-connection-state can be carried out based on a combination of the vehicle speed V and the required torque Tr.

(Control of the T/M, the E/G, the M/G, and the Changeover Mechanism Regarding the Kick-Down-Operation)

Next will be described an example of a pattern regarding a control of the T/M, the E/G, the M/G, and the changeover mechanism regarding the kick-down-operation, with reference to FIG. 3. The kick-down-operation means an operation in which the transmission reduction ration Gtm is increased (i.e., the gear position of the transmission is shifted/changed to a lower gear position), in a case in which the driver of the vehicle increases the operation amount (acceleration pedal opening degree) of the acceleration pedal AP. The kick-down-operation is performed, in a case in which a predetermined condition (kick-down-condition) is satisfied (e.g., when a sufficient driving force can not be generated with respect to the increased acceleration pedal opening degree).

Figure 3:
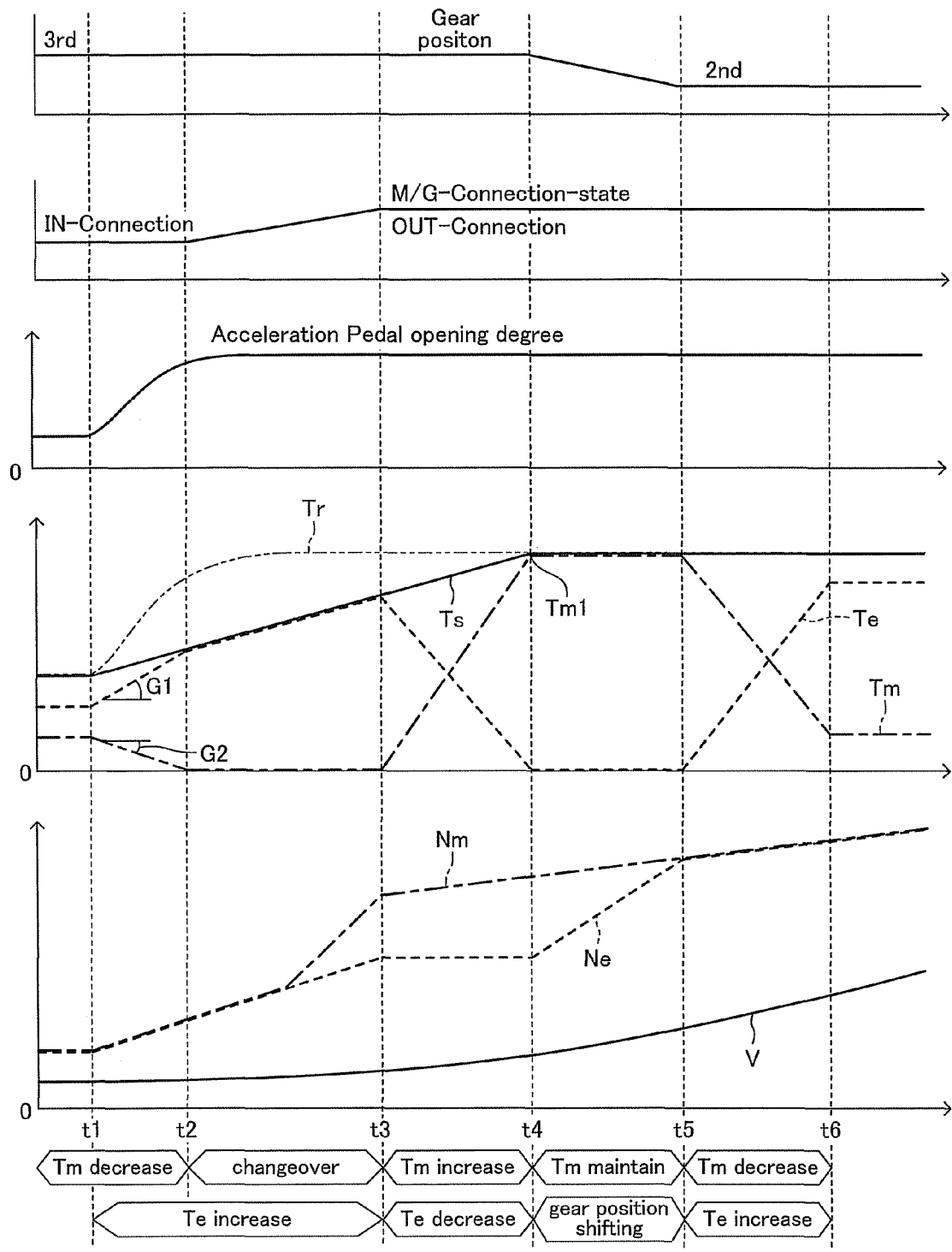
FIG. 3 is a time-line chart showing one example of a change in a gear position shifting operation, a changeover operation, various torques and rotational speeds, and so on, when a kick-down-condition is satisfied in an IN-Connection State.

FIG. 3 shows one example of a case in which the kick-down-condition from "the 3rd gear position" to "the 2nd gear position" is satisfied at time t1 upon an increase in the acceleration pedal opening degree caused by the driver's operation, in a period in which the vehicle is driving by a driving force owing to the E/G side output torque Te and the M/G side output torque Tm when the M/G-connection-state is in the IN-Connection State and the gear position of the T/M 20 is at "the 3rd gear position". In this example, it is assumed that the first reduction ratio G1 is equal to 1. Accordingly, the M/G rotational speed Nm coincides with the E/G rotational speed Ne.

As shown in FIG. 3, when the kick-down-condition is satisfied (refer to time t1), an operation regarding the changeover of the M/G-connection-state is firstly started. In this example, from a timing (time t1) of the satisfaction of the kick-down-condition, the M/G side output torque Tm is decreased from a value at the timing of the satisfaction of the kick-down-condition to zero (from time t1 to time t2). Further, from the timing (time t1) of the satisfaction of the kick-down-condition, the E/G side output torque Te is increased from a value at time t1 (from time t1 to time t2).

Now, an increasing inclination angle G1 of the E/G side output torque Te is set to be larger than a decreasing inclination angle G2 (G2>0) of the M/G side output torque Tm. Accordingly, a total torque Ts (=Te+Tm) increases in a period from time t1 to time t2.

When M/G side output torque Tm reaches zero (at time t2), the changeover operation from the IN-Connection State to the OUT-Connection State itself is started. In this example, this changeover operation ends (is completed) at time t3. Further, in this example, the M/G rotational speed Nm is adjusted by letting the output shaft A4 of the M/G 40 run idle from a predetermined time (at which the M/G-connection-state is in the neutral state) between time t2 and time t3, in order to match the M/G rotational speed Nm with "a rotational speed corresponding to the vehicle speed" in the M/G-connection-state (i.e. the OUT-Connection State) after the completion of the changeover operation when the changeover operation is completed (at time t3). In this example, it is assumed that the OUT-connection reduction ratio Gout is set at a value equal to the transmission reduction ration Gtm when the gear position of the T/M 20 is at "the 2nd gear position". Accordingly, after the predetermined time, the M/G rotational speed Nm starts to further increases so as to be apart from the E/G rotational speed Ne (which is equal to a value corresponding to "the 3rd gear position"), so that a difference between the M/G rotational speed Nm and the E/G rotational speed Ne increases.

In addition, the E/G side output torque Te is continued to be increased from a time before time t2, and over a period of the changeover operation (from time t2 to time t3). On the other hand, the M/G side output torque Tm is kept at zero during the changeover operation. Accordingly, during the changeover operation, the total torque Ts (which starts increasing from a time before t2) increases continuously with having the same value as the E/G side output torque Te.

When the changeover operation ends (at time t3), a gear position shifting operation (kick-down-operation) from "the 3rd gear position" to "the 2nd gear position" is started. In this example, after the time (time t3) at which the changeover operation ends, the E/G side output torque Te is decreased from a value at time t3 to zero (from time t3 to t4). The adjustment of the E/G side output torque Te is performed not only by adjusting the E/G torque itself but also by adjusting the clutch torque when the C/T 30 is in the half-provide-half-shut state. As described above, the adjustment of the clutch torque is carried out with maintaining a state in which the E/G torque is larger than the clutch torque.

Further, after the time (time t3) at which the changeover operation ends, the M/G side output torque Tm is increased from zero (from time t3 to time t4). In this example, the M/G side output torque Tm is increased in such a manner that the M/G side output torque Tm reaches the required torque Tr when the E/G side output torque Te reaches zero (at time t4), and in such a manner that the total torque Ts increases in a period between time t3 and time t4.

When the E/G side output torque Te reaches zero (at time t4), the gear position shifting operation from "the 3rd gear position" to "the 2nd gear position" itself is started. This gear position shifting operation ends (is completed) at time t5. Consequently, during the gear position shifting operation (from time t4 to time t5), the E/G rotational speed Ne is increased from "an E/G rotational speed corresponding to the vehicle speed" when the gear position is at "the 3rd gear position" to "an E/G rotational speed corresponding to the vehicle speed" when the gear position is at "the 2nd gear position". The E/G rotational speed corresponding to "the vehicle speed when the gear position is at the 2nd gear position at time t5" is equal to the M/G rotational speed Nm at time t5. This adjustment of the E/G rotational speed Ne to increase the E/G rotational speed Ne is carried out by letting the output shaft A1 of the E/G 10 run idle, while the C/T 30 is maintained in the shut-off state.

Further, in this example, the M/G side output torque Tm is adjusted so as to be equal to the required torque Tr, during the gear position shifting operation (from time t4 to time t5). The E/G side output torque Te is adjusted so as to be equal to zero during the gear position shifting operation. Accordingly, in this example, the total torque Ts is equal to the required torque Tr during the gear position shifting operation.

In this example, when the gear position shifting operation from "the 3rd gear position" to "the 2nd gear position" ends (at time t5), the E/G side output torque Te is increased from zero, and the M/G side output torque Tm is decreased from the value at time t5 (equal to the required torque Tr), while the total torque Ts is maintained at a value equal to the required torque Tr (from time t5 to time t6). As described above, the adjustment of the E/G side output torque Te is performed not only by adjusting the E/G torque itself but also by adjusting the clutch torque when the C/T 30 is in the half-provide-half-shut state. This allows the distribution between the E/G side output torque Te and the M/G side output torque Tm to become closer to a target distribution determined based on the current driving condition of the vehicle.

After the distribution between the E/G side output torque Te and the M/G side output torque Tm coincides with the target distribution determined based on the current driving condition of the vehicle (at time t6), the distribution between the E/G side output torque Te and the M/G side output torque Tm is adjusted based on the driving condition of the vehicle, while the total torque Ts is maintained at a value equal to the required torque Tr.

As described above, according to the present apparatus, in the example shown in FIG. 3, after the kick-down condition is satisfied (at time t1), the changeover operation from the IN-Connection State to the OUT-Connection State is carried out (from time t2 to time t3). This changeover operation provides/realize a state in which the M/G torque is continuously transferred to the output shaft A3 of the T/M 20 (and accordingly, to the drive wheels) during the gear position shifting operation. After the completion of the changeover operation (i.e., after time t3), the gear position shifting operation (kick-down-operation) is performed. By this gear position shifting operation, the transmission reduction ratio Gtm increases from the value obtained when the transmission reduction ratio Gtm is the value corresponding to "the 3rd gear position" to the value obtained when the transmission reduction ratio Gtm is the value corresponding to "the 2nd gear position".

Accordingly, when the kick-down is performed, a state is obtained/realized in which the vehicle can be sufficiently accelerated owing to (based on) the M/G side output torque Tm, from the time (time t3) at which the changeover operation is completed, at latest. In addition, during the gear position shifting operation (from time t4 to time t5), a state is obtained in which the vehicle can be sufficiently accelerated by the M/G side output torque Tm owing to the OUT-Connection State.

In addition, in the present apparatus, in the example shown in FIG. 3, after the kick-down-condition is satisfied and before the changeover operation ends (from time t1 to time t3), the E/G side output torque Te is increased. Accordingly, from a time before the changeover operation ends (i.e., from a time before time t3), the vehicle can be sufficiently accelerated owing to (based on) the E/G side output torque Te. That is, the vehicle can be sufficiently accelerated from an earlier stage, compared to a case in which the E/G side output torque Te is not increased after the satisfaction of the kick-down-condition.

Further, in the present apparatus, in the example shown in FIG. 3, during a period (from time t1 to time t2) in which the M/G side output torque Tm is decreasing before the changeover operation is started, the M/G side output torque Tm and the E/G side output torque Te are adjusted so that the total torque Ts is increased. Accordingly, from a time before the changeover operation is started (i.e., from a time before time t2), the vehicle can be sufficiently accelerated owing to (based on) the E/G side output torque Te and the M/G side output torque Tm. That is, the vehicle can be sufficiently accelerated from an earlier stage, compared to a case in which the total torque Ts decreases before the start of the changeover operation.

Further, in the present apparatus, in the example shown in FIG. 3, after the changeover operation ends and before the gear position shifting operation starts (from time t3 to time t4), the M/G side output torque Tm and the E/G side output torque Te are adjusted so that the total torque Ts is increased. Accordingly, the vehicle can be continued to be sufficiently accelerated by (owing to) the M/G side output torque Tm and the E/G side output torque Te, after the changeover operation ends and before the gear position shifting operation starts (from time t3 to time t4), in addition to a period starting from a time during the changeover operation is performed.

Further, in the present apparatus, in the example shown in FIG. 3, during the gear position shifting operation (from time t4 to time t5), the M/G side output torque Tm is adjusted in such a manner that the M/G side output torque Tm becomes equal to the required torque Tr. That is, in the period in which the gear position shifting operation is carried out, the total torque Ts is controlled so as to coincide with the required torque Tr. Accordingly, at a time close to the start of the gear position shifting operation (i.e., at a time close to time t4), the apparatus can provide to the driver a feeling that the gear position shifting operation has already finished. In other words, the apparatus can provide to the driver a feeling that the gear position shifting operation finishes earlier than the end of the actual gear position shifting operation.

The present invention is not limited to the embodiment described above, but may be modified as appropriate without departing from the scope of the invention. For example, in the embodiment (in the example shown in FIG. 3), the changeover from the IN-Connection State to the OUT-Connection State is performed as the changeover before the kick-down-operation, however, the changeover from the neutral state to the OUT-Connection State may be performed, instead. In this case, the changeover mechanism may be configured so as to change the M/G-connection-state between "the OUT-Connection State" and "the neutral state". Alternatively, the changeover mechanism may be configured so as to be able to change the M/G-connection-state from any one of the IN-Connection State, the OUT-Connection State, and the neutral state to any one of the rest.

Further, in the embodiment (in the example shown in FIG. 3) described above, when the current/present M/G-connection-state is in a state other than the OUT-Connection State, the changeover to the OUT-Connection State is carried out before the kick-down-operation. However, when the current/present M/G-connection-state is in the OUT-Connection State, the changeover to the OUT-Connection State is not carried out before the kick-down-operation.

Further, in the embodiment (in the example shown in FIG. 3) described above, the M/G side output torque Tm is increased after the time (at time t3) at which the changeover operation ends in such a manner that the M/G side output torque Tm reaches the required torque Tr at the time (at time t4) at which the gear position shifting operation is started. However, The M/G side output torque Tm may be increased after the time (time t3) at which the changeover operation ends in such a manner that the M/G side output torque Tm reaches a target torque which is determined based on any one or more of the acceleration pedal opening degree, the E/G rotational speed Ne, a temperature of a cooling water of the E/G 10, and a temperature of a lubricating oil of the E/G 10, and the like.

Further, in the embodiment (in the example shown in FIG. 3) after the kick-down-condition is satisfied and before the changeover operation starts (from time t1 to time t2), the increasing inclination angle G1 of the E/G side output torque Te and the decreasing inclination angle G2 of the M/G side output torque Tm are constant, however, the angle G1 and the angle G2 may be varied in accordance with a time lapse as long as the total torque Ts increases.

Further, in the embodiment described above, the so-called automated manual transmission which uses the multiple gear ratio transmission which does not include a torque converter is used as the transmission, however, a multiple gear ratio transmission or a continuously variable transmission (a so-called automatic transmission (AT)) may be used as the transmission, each including a torque convertor and automatically performing an gear position shifting operation in accordance with the driving condition of the vehicle. In this case, the C/T 30 is omitted.

What is claimed is:

1. A vehicular power transmission control apparatus applied to a vehicle comprising an internal combustion engine and an electric motor as power sources, comprising:

a transmission providing a power transmission path between an input shaft of said transmission and an output shaft of said internal combustion engine, and an output shaft to provide a power transmission path between said transmission and drive wheels of said vehicle, wherein said transmission is capable of adjusting a transmission reduction ratio which is a ratio of a rotational speed of said input shaft of said transmission to a rotational speed of said output shaft of said transmission;

a changeover mechanism which is capable of changing a connection state of an output shaft of said electric motor to any one from two or more of an input-side-connection state, an output-side-connection state, and a non-connection state as an essential state, said input-side-connection state being a state in which a power transmission path is provided between said output shaft of said electric motor and said input shaft of said transmission, said output-side-connection state being a state in which a power transmission path is provided between said output shaft of said electric motor and said output shaft of said transmission without involving said transmission, and said non-connection state being a state in which neither a power transmission path between said output shaft of said electric motor and said input shaft of said transmission, nor a power transmission path between said output shaft of said electric motor and said output shaft of said transmission is provided;

means for determining whether or not a kick-down-condition is satisfied based on an increase in an operation amount of an acceleration operating member operated by a driver of said vehicle, said kick-down-condition being a condition for increasing said transmission reduction ratio; and means for controlling, when and after said kick-down-condition is satisfied, firstly said changeover mechanism so as to perform a changeover operation for changing said connection state of said output shaft of said electric motor, and secondly said transmission so as to perform a gear position shifting operation for increasing said transmission reduction ratio after said changeover operation is completed.

2. A vehicular power transmission control apparatus according to claim 1, wherein said means for controlling is configured so as to change said connection state of said output shaft of said electric motor from a sate state other than said output-side-connection state to said output-side-connection state.

3. A vehicular power transmission control apparatus according to claim 2, wherein said means for controlling is configured so as to adjust an internal-combustion-engine-side-output-torque in such a manner that said internal-combustion-engine-side-output-torque is increased after said kick-down-condition is satisfied and before said changeover operation ends, said internal-combustion-engine-side-output-torque being a torque which is transmitted to said output shaft of said transmission and which is owing to a torque of said output shaft of said internal combustion engine.

4. A vehicular power transmission control apparatus according to claim 3, wherein said control means for controlling is configured so as to, before said changeover operation is started, adjust an electric-motor-side-output-torque and said internal-combustion-engine-side-output-torque in such a manner that said electric-motor-side-output-torque is decreased, and a total torque is increased while said electric-motor-side-output-torque is decreased, said electric-motor-side-output-torque being a torque which is transmitted to said output shaft of said transmission and which is owing to a torque of said output shaft of said electric motor, and said total torque is a sum of said internal-combustion-engine-side-output-torque and said electric-motor-side-output-torque.

5. A vehicular power transmission control apparatus according to claim 4, wherein said means for controlling is configured so as to, after said changeover operation is completed and before said gear position shifting operation is started, adjust said electric-motor-side-output-torque and said internal-combustion-engine-side-output-torque in such a manner that said internal-combustion-engine-side-output-torque is decreased, and said total torque is increased while said internal-combustion-engine-side-output-torque is decreased.

6. A vehicular power transmission control apparatus according to claim 5, wherein said means for control is configured so as to, during said gear position shifting operation is being performed, adjust said electric-motor-side-output-torque in such a manner that said electric-motor-side-output-torque is equal to a drive torque which said driver requires and which is a value obtained based on an operation of said acceleration operating member.

7. A vehicular power transmission control apparatus according to claim 1, comprising a clutch mechanism, disposed between said output shaft of said internal combustion engine and said input shaft of said transmission, for shutting and providing a power transmission path between said output shaft of said internal combustion engine and said input shaft of said transmission, and wherein, said transmission is a multiple gear ratio transmission which does not comprise a torque converter and which can realize each of a plurality of predetermined reduction ratios different from one another as said transmission reduction ratio, and said means for controlling is configured so as to, based on a driving condition of said vehicle, control shutting and providing of said power transmission path by said clutch mechanism, and so as to control said transmission reduction ratio.

* * * * *